United States Patent Office 3,247,281
Patented Apr. 19, 1966

3,247,281
WATER REPELLENT COMPOSITIONS CONTAINING WATER SOLUBLE AMINOSILANES AND AMINOSILICONES AS CURING CATALYSTS AND PROCESS FOR TREATING SUBSTRATES THEREWITH
Domenick D. Gagliardi, East Greenwich, R.I., assignor to Union Carbide Corporation, a corporation of New York
No Drawing. Filed Sept. 27, 1961, Ser. No. 140,990
11 Claims. (Cl. 260—825)

This invention relates to water repellent silicones and to methods and compositions for effecting the deposition, adsorption and curing thereof on various fabrics and materials.

Heretofore, silicone water repellents have been cured usually with fatty acid salts of lead, tin, zinc and zirconium. These are water-insoluble toxic salts which must be emulsified for practical use. Moreover, they are employed efficaciously only at elevated temperatures.

Accordingly, it is an object of this invention to provide means for eliminating the use of these toxic salts normally used as catalysts in effecting the application of silicones to fibrous materials and to provide, as well, a method wherein the curing cycle proceeds at reduced temperatures, which latter state is required with many of the materials to which it is deemed desirable or necessary to impart water repellency, such as, for example, paper, leather, certain textiles and like temperature sensitive surfaces and materials.

In accordance with the present invention, it has been discovered that aminosilicone monomers, polymers, and copolymers, and particularly the water-soluble members thereof, are effective catalysts for use with silicone water-repellent compositions, such as, for example, solutions, emulsions and the like, containing free fatty acids. The water-soluble catalysts or curing agents from among these compounds are readily admixed with the siloxanes employed, to produce water-repellency, thus obviating the necessity of formulating separate emulsions thereof. These aminosilicones or their corresponding carboxylic acid salts or metallic complexes are thus incorporated into aqueous solutions of curable water-repellent silicones, or separately prepared in the form of aqueous or other solvent solutions or, if desired, as emulsions, soaps or the like, prior to combination therewith. As noted, the aminosilicone catalysts of the invention permit curing at reduced temperatures; are, in addition, non-odorous; and evidence a reduced toxicity over water repellent compositions employed heretofore. Further, they provide stable baths, particularly to emulsion splitting and gel formation, for the many ingredients needed in the applications of the repellent silicones and result in high water repellency effects at extremely low concentrations.

Thus, this invention involves a method of effecting deposition and adsorption of a composition which after curing imparts a water-repellent quality to a continuous substrate material and comprises applying to said substrate a composition containing a siloxane and an aminosilicone as described hereinafter, and subsequently drying and curing the aforesaid composition on said substrate. While deposition is normally accomplished by immersion or padding other standard techniques such as spraying and the like can also be employed effectively.

The use of aminosilicones as catalysts or curing agents, in the form of solvent solutions, water-soluble salts, or emulsions, affords substantially complete deposition, adsorption and curing of the siloxane present on substrate materials as a water-repellent composition in a period of normally less than ten minutes. It is convenient and desirable, normally, that the curable water repellent siloxane be deposited from an aqueous or solvent solution. This procedure is necessary however only to control loading.

The concentrations of water-repellent silicone and aminosilicone catalyst are not narrowly critical. Normally, however, it is most practicable to maintain both constituents in a dilute solution or emulsion. It is noted in this respect that most substrate materials are treated and coated with curable water-repellent silicone at a concentration of 0.05 percent to 4 percent. Thus, an illustrative range of curable silicone water-repellent is in the range of 0.5 percent to 3.0 percent in the treating bath. The preferred range of repellent as deposited on the substrate material is normally, however, from 0.5 percent to 1.5 percent. In some instances however, as little as 0.05 percent to 0.1 percent of the curable silicone water repellent may be used. Similarly, an illustrative range of aminosilicone curing agent often employed is from .15 percent to 3.0 percent, while a preferred range is from 0.3 percent to 1.0 percent, based on silicone content. Percentages referred to herein and throughout this description are percentages by weight unless otherwise explicitly indicated.

The aminosilicone catalysts are normally dissolved in a suitable aqueous or organic solvent, whether they are subsequently diluted with water or further organic solvent prior to incorporation in the curable siloxane treating bath. Illustrative solvents are alkanols containing from 1 to 4 carbon atoms such as isopropanol, ethanol, or the like.

The procedure herein described is not sensitive to pH; however, since many fibrous materials and fabrics are capable of being weakened or destroyed by extremely acidic or basic conditions, such extremes of pH are desirably avoided.

Neither the temperature nor time of curing is critical since this operation proceeds well at ambient room temperatures, for example, 70° F. and by way of illustration, up to 120° F. in an efficacious manner. Higher temperatures, up to 220° F. and, if desired, up to 325° F., are also entirely practicable. The period of curing may be as little as several minutes, e.g., 5 minutes to 10 minutes, to several hours, e.g. 8 hours to 16 hours.

The aminosilicone catalysts of the present invention require only the presence of a functional group of the formulation:

(I) 

wherein the divalent R-linkage between the silicon atom and amino nitrogen atom constitutes a linear or cyclic hydrocarbon chain of three (3) or more atoms chain length, on which the amino nitrogen is substituted no closer than the third carbon atom removed from silicon as, for example, a polymethylene chain of three or more carbon atoms, or a parasubstituted pyridyl radical, and the like. The divalent R-linkage can be unsubstituted or carry additional hydrocarbon substituents along its length. The free valences of the amino nitrogen may both be substituted with hydrogen atoms to form primary amines or constitute imine (secondary) or nitrile (tertiary) structures carrying simple alkyl radicals or substituted alkyl groups of the types of cyanoalkyl, aminoalkyl, carboalkoxyalkyl, or carboxyalkyl radicals, and/or aryl substituents such as phenyl or pyrrolidyl radicals, or fused aromatic ring structures such as naphthalene, and the like. Alternatively, the nitrogen atom may be symmetrically substituted in bis-imine or tris-nitrile fashion by means of other polymethylenesilylidyne groupings [—(CH$_2$)$_a$Si≡]. The free valences on the one or more silicon atoms may be satisfied with mixed alkoxy and alkyl or aryl substituents where monomeric silanes are involved, or with Si—O linkages and alkyl and aryl radicals in the case of the aminoalkylpolysiloxanes or copolymers of aminoalkylpolysiloxanes with other polysiloxanes. In essence, therefore, the functional grouping required in the catalysts or curing agents of the invention may be represented in general by the following formula:

(II)
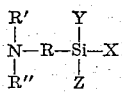

wherein R is a substituted or unsubstituted hydrocarbon group of at least 3 carbon atoms chain-length; R' and R'' represent members selected from the group consisting of hydrogen, alkyl, cyanoalkyl, aminoalkyl, carboalkoxyalkyl, carboxyalkyl, and aryl radicals, and the monovalent grouping—

(III)
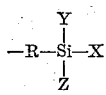

wherein X is a member selected from the group consisting of alkoxy, aminoalkyl, hydroxyalkylaminoalkyl, and siloxylidyne radicals [$\equiv$Si—O—]; and Y and Z are members selected from the group consisting of alkoxy, alkyl, aryl, aminoalkyl and hydroxyalkylaminoalkyl radicals.

As indicated above, the necessary functional aminoalkylsilicon grouping of the curing catalysts of the present invention may be contained within a monomeric aminoalkylalkoxysilane, an aminoalkylpolysiloxane, or a copolymer or simple blend of an aminoalkylpolysiloxane with one or more other siloxanes. It is not necessary that these materials be employed in pure form but crude hydrolyzates may, for example, be employed. Indeed, aqueous and aqueous-alcoholic solutions of the silicones are most desirably used for incorporation in emulsions to introduce the aminoalkyl silicon groups onto the fibrous material or fabric.

The aminoalkoxysilanes which can be employed in practicing the invention may be represented by the following general formula:

(IV)
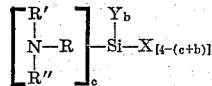

wherein R, R', and R'' have the same meanings as previously assigned above; X is an alkoxy radical; Y is a member selected from the group consisting of alkyl and aryl radicals; c is a whole number of from 1 to 2; b is zero or a whole number of from 1 to 2; and the sum of (c+b) is not greater than 3.

The following specific silanes are illustrative of some of the aminoalkylsilyl-functional derivatives included among the class of compounds defined within Formula IV above:

Beta-methyl-gamma-aminopropyltriethoxysilane
Gamma-aminopropyltriethoxysilane
Gamma-aminopropyltripropoxysilane
Gamma-aminopropylmethyldiethoxysilane
Gamma-aminopropylethyldiethoxysilane
Gamma-aminopropylphenyldiethoxysilane
Delta-aminobutyltriethoxysilane
Delta-aminobutylmethyldiethoxysilane
Delta-aminobutylethyldiethoxysilane
Delta-aminobutylphenyldiethoxysilane
Gamma-aminobutyltriethoxysilane
Gamma-aminobutylmethyldiethoxysilane
N-beta-carbethoxyethyl-gamma-aminopropyltriethoxysilane
N-beta-cyanoethyl-delta-aminobutyltriethoxysilane
N-gamma-triethoxysilylpropylpyrrolidine
N-gamma-triethoxysilylpropyl-2,5-dimethylpyrrolidine
N-phenyl-N-methyl-gamma-aminopropyltriethoxysilane
N-phenyl-N-methyl-delta-aminobutyltriethoxysilane
N-methyl-beta-methyl-gamma-aminopropyltriethoxysilane Bis(gamma-triethoxysilylpropyl)imine
Bis(beta-methyltriethoxysilylpropyl)imine
N,N-dimethyl-gamma-aminopropyltriethoxysilane
N-naphthyl-N-methyl-gamma-aminopropyltriethoxysilane
N-(furfuryl)-gamma-aminopropyltriethoxysilane
N-beta-aminoethyl-gamma-aminopropyltrimethoxysilane
N-gamma-aminopropyl-gamma-aminopropyltriethoxysilane
N-gamma-aminopropyl-delta-aminobutylmethyldiethoxysilane
N-beta-aminoethyl-gamma-aminoisobutyldiethoxysilane The aminoalkylpolysiloxanes which can be employed to carry the desired functional group represented by Formula I above for purposes of the invention, may be linear, cyclic or cross-linked in nature. The aminoalkylpolysiloxanes of the cross-linked variety are readily produced by the hydrolysis and condensation of the trialkoxy-substituted silylalkylamines, -imines, or -nitriles, and can contain small amounts of silicon-bonded hydroxyl groups or silicon-bonded alkoxy groups depending on the conditions under which polymerization is conducted. For example, aminoalkylpolysiloxanes of this type which are essentially free of residual silicon-bonded alkoxy or hydroxyl groups can be produced by the complete hydrolysis and total condensation of an aminoalkyltrialkoxysilane, whereas polymers containing predominant proportions of residual alkoxy groups can be produced by the partial hydrolysis and total condensation of the same starting silane. In a similar manner, polymers containing predominant proportions of residual silicon-bonded hydroxyl groups can be produced by essentially complete hydroylsis and only partial condensation of the tri-functional silane starting materials. Polysiloxanes of the foregoing types may be represented in general by the following unit structural formula:

(V)
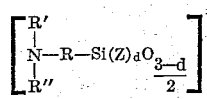

wherein R, R', and R'' have the same meanings as previously assigned above; Z represents hydroxyl and alkoxy groups; and d has an average value of from 0 to 2 and preferably from 0 to 1. Typical polymers from among the compounds of this class include gamma-aminopropylpolysiloxane, delta-aminobutylpolysiloxane, etc., and related hydroxyl- and alkoxy-containing hydrolyzates and condensates of these polymers.

Aminoalkoxypolysiloxanes of the cyclic and linear varieties may be produced readily by the hydrolysis and condensation of dialkoxyalkyl- or dialkoxyarylsilylalkylamines, -imines, and -nitriles. These polymers may be represented in general by the following structural formula:

(VI)
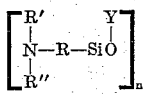

wherein R, R', and R'' have the same meanings as previously assigned above; Y is an alkyl or aryl radical; and n is an integer having a value of at least 3, with average values of from 3–7 for the cyclic polysiloxanes, and higher for the linear polysiloxanes. Illustrative of the cyclic polymers for use as catalysts or curing agents in the present invention from this class are the cyclic tetramers of gamma-aminopropylmethylpolysiloxane and delta-aminobutylmethylpolysiloxane and the like. The linear polymers can be structures of the type of gamma-aminopropylmethylpolysiloxane, gamma-aminopropylethylpolysiloxane, and the like. The linear aminoalkylpolysiloxanes further include alkyl, alkoxy, and hydroxyl end-blocked materials which contain from 1 to 3 such groups bonded to the terminal silicon atoms of the molecules comprising the polymeric chains. For example, linear polymers such as mono-ethoxy end-blocked gamma-aminopropylethylpolysiloxane, methyldiethoxysilyl end-blocked delta-aminobutylmethylpolysiloxane, mono-ethoxydimethylsilyl end-blocked gamma-aminopropylphenylpolysiloxane, and the like and can be employed as catalysts in the deposition and absorption of water-repellent silicones on fibrous materials. These end-blocked polymers can be readily produced by the equilibration of cyclic aminoalkylpolysiloxanes with silicon compounds containing predominant silicon-bonded alkoxy groups, or by the cohydrolysis and condensation of trialkylalkoxysilanes with aminoalkylalkyldiethoxysilanes or aminoalkylaryldiethoxysilanes. The hydroxy end-blocked polymers can be prepared, also, by heating linear or cyclic aminoalkylpolysiloxanes with water.

The copolymeric polysiloxanes which are employed as catalyst or curing agents in accordance with the present invention may contain siloxane units consisting of any of the typical siloxyalkylamine, -imine or -nitrile groups depicted above, in combination with one or more other hydrocarbon-substituted siloxane units of any desired configuration, as represented in general by the formula:

(VII) 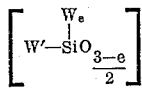

wherein W and W' are hydrocarbon radicals; and $e$ is an integer having a value of from 0 to 2. These copolymers may be produced by the cohydrolysis and condensation of typical aminoalkylsilanes with other hydrocarbon-substituted silanes, or by the direct equilibration of separate polymeric starting materials. The linear copolymers can also contain chain-terminating or end-blocking groups such as alkyl, hydroxyl and alkoxy radicals. The various polymeric and copolymeric materials of the types discussed hereinabove, as well as processes for producing these materials, have been described in substantial detail in U.S. Patent 2,832,754; and U.S. applications Serial Nos. 615,481, 615,483, and 744,675 filed on October 12, 1956, October 12, 1956, and June 26, 1958, respectively; each of said applications being now abandoned.

The aminoalkylsilicone catalysts hereinabove described may be efficaciously employed in the form of their metal coordinated complexes with metallic components of the type of copper, chromium, cobalt, nickel, tin, zinc, and the like. Of particular interest in this connection are the copper complexes of the base aminosiloxane polymers and monomeric silanes, which may be readily prepared by aqueous reaction of the aminosilicones with water-soluble copper derivatives such as cupric chloride, acetate or sulfate, or water-dispersible or insoluble copper derivatives such as the hydroxide, stearate, and the like.

The aminosilicone catalysts of the invention may also be employed in the form of the carboxylic acid salts. Indeed, this is normally the preferred and most effective mode of employment. Suitable carboxylic acids are, for example, acetic acid, lauric acid, palmitic acid, oleic acid, stearic acid, levulinic acid, coconut fatty acid, maleic acid, and most desirably 2-ethylhexoic acid. Thus, the carboxylic acids employed herein include saturated and unsaturated monocarboxylic and dicarboxylic acids which may contain additionally at least one keto (alkyl carbonyl) or alkyl substituent, the number of carbon atoms in either of these substituents being normally in the range of 1 to 4 inclusive. The concentration of carboxylic acid required for salt formation in the treating bath is generally within the range of 0.1 percent to 7.0 percent and preferably from 0.25 percent to 5.0 percent.

The silicones which are capable of being deposited, adsorbed and cured to impart a water-repellent character to a suitable substrate by the practice of the present invention employing the aforesaid aminoalkyl silicone catalysts are the homopolymers and copolymers of methyl siloxanes, wherein the polysiloxane contains at least 5 percent and preferably at least 10 percent by weight of SiH groups. Thus, alkyl and aryl substituted copolymeric polysiloxanes may be employed which contain at least 5 percent silicon-bonded hydrogen in the cured state and one or more siloxane units of any desired configuration, as represented by the formula:

(VIII) 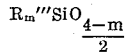

wherein R''' is a monovalent hydrocarbon group or a hydroxylated monovalent hydrocarbon radical and $m$ has an average value within the range of 1 to 3 inclusive. Illustrative of the monovalent hydrocarbon constituents which R may represent are alkyl radicals such as, for example, methyl, ethyl, butyl and octadecyl; alkenyl radicals such as, for example, vinyl, allyl, and hexenyl; cycloaliphatic radicals such as cyclohexyl and cyclohexenyl; aryl radicals such as phenyl, xeryl, naphthyl and tolyl, and alkaryl hydrocarbon radicals such as benzyl. Examples of the hydroxylated hydrocarbon radicals which R may represent are gamma-hydroxypropyl, 5-hydroxypropyl, hydroxycyclopentyl, hydroxycyclohexyl, hydroxyphenyl, 3-hydroxymethyl-2-methylcyclohexyl, and the like.

Any conventional emulsifying agent used with water-repellent silicones, either anionic or cationic, can be employed in the practice of the present invention. However, for purposes of compatibility, non-ionic emulsifying agents are normally preferred. Illustrative of these are alkyl ethers of polyalkylene glycols such as polypropylene glycol monobutyl ether, polyethylene glycol 2-ethylhexyl ether and polyethylene glycol monobutyl ether and esters of polyhydric alcohols such as glycerol monostearate, polyoxyethylenedistearate and propylene glycol monolaurate, or substances such as polyvinyl alcohol. Although not narrowly critical, the amounts of emulsifying agent employed are normally 20 percent or less by weight of the curable siloxane incorporated in the emulsion.

The process of the present invention can be employed with a wide and varied host of materials; for example, paper and leather, as noted above, and fabrics and fibrous materials such as cotton, wood, wool, nylon, linen, silk, fur, cellulose triacetate, regenerated cellulose and inorganic materials made from glass, asbestos and the like. The process of the present invention is similarly applicable to and effective with synthetic polymeric fibers formed from copolymers of acrylonitrile and vinyl chloride (i.e., Dynel, a trade name) and prepared as described in U.S. Patent 2,420,330; those prepared by the condensation of dimethyl terephthalate and ethylene glycol (Dacron, a trade name); that made primarily from polyacrylonitrile (Orlon, a trade name); the polyamides known under the designation of nylon and formed by polymerization of a hexamethylene-diamine salt of adipic acid; rayon, a fiber manufactured from cellulose or including a cellulose base; and like materials. Thus, the terms "substrate material," "continuous substrate material" and the like employed throughout this specification are intended to encompass the aforesaid materials.

The following examples are further illustrative of the invention.

*Example 1*

Samples of hand paper towels were treated by padding with three dilute compositions, a single composition being applied to any single group of towels. Each of these compositions contains one percent of one of the aminosilicone catalyst compositions, N - (beta - aminoethyl)-gamma-aminopropyltriethoxysilane, N-(beta-aminoethyl-gamma-aminopropyltrimethoxysilane, a 30 percent ethanol solution of gamma-aminopropylpolysiloxane (homopolymer—30% solids), 89 percent water and 10 percent by weight of a concentrated emulsion composed of 30 parts of methylhydrogensiloxane end-blocked with trimethylsiloxy groups, 5 parts of 2-ethylhexoic acid, 1 part of polyvinyl alcohol (Elvanol 50–42, trade name, a water-soluble odorless, white to creamy white powdered resin) and 64 parts of water. This concentrated emulsion is prepared by admixture of the polyvinyl alcohol with the water in the proportions indicated at 80° F. Using high-speed stirring, 30 parts of methylhydrogenpolysiloxane were added slowly and stirred for 2 to 3 minutes until the emulsion was homogeneous. The 2-ethylhexoic acid was then added to the emulsion. It is noted that the terms "part" and "parts" as employed herein and throughout this description refer to parts by weight unless otherwise explicitly indicated. The impregnated papers were air-dried overnight at room temperature. Each of the aforesaid aminosilicone catalysts cured the silicone water repellent contained in the dilute padding compositions as indicated by the high water repellency of the paper towels and as measured by the spray rating (AATCC 22–1952) measurement of 100 possessed in each instance. The paper towels also evidenced a high wet strength in each case.

*Example 2*

A concentrated emulsion containing 30 parts by weight of methylhydrogensiloxane end-blocked with trimethyl siloxy groups, 5 parts of 2-ethylhexoic acid, 1 part of polyvinyl alcohol (Elvanol 50–42), and 64 parts of water, was prepared and tested with varying concentrations of a 30 percent ethanol solution of gamma-aminopropylpolysiloxane (homopolymer—30 percent solids) as the catalyst, as indicated in Tables I, II, and III appearing hereinafter. Aqueous dilutions containing 9 percent of concentrated emulsion were used to treat a cotton khaki twill, a wool flannel and a nylon satin. The swatches of fabric were padded at the following pick-up values:

|  | Percent |
|---|---|
| Cotton | 60 |
| Wool | 76 |
| Nylon | 52 |

After padding, the swatches were dried for 10 minutes. Spray rating tests were performed by AATCC Standard Test Method 22–1952 (page 164, 1959 Technical Manual of the Association of Textile Chemists and Colorists) after drying, as reflected in Table I appearing hereinafter; sequentially, the swatches were washed with soap and soda ash at 160° F. for a period of one hour in an automatic washer to determine durability, as shown in Table II appearing below.

TABLE I

| Percent of catalyst used | Initial spray ratings | | |
|---|---|---|---|
| | Cotton | Wool | Nylon |
| 0.15 | 100 | 100 | 100 |
| 0.3 | 100 | 100 | 90+ |
| 0.6 | 100 | 100 | 90+ |
| 0.9 | 100 | 100 | 90+ |

TABLE II

| Percent of catalyst used | Spray ratings after wash | | |
|---|---|---|---|
| | Cotton | Wool | Nylon |
| 0.15 | 70 | 100 | 90 |
| 0.3 | 70 | 100 | 90 |
| 0.6 | 80− | 100 | 90 |
| 0.9 | 70 | 100 | 90 |

A five percent concentrated emulsion was prepared, as described above, in an aqueous medium with and without the aforesaid aminosilicone catalyst, 30 percent ethanol solution of gamma-aminopropylpolysiloxane (homopolymer—30 percent solids). The comparative test procedure followed was the same as that employed with relation to Tables I and II above. The results are indicated in Table III.

TABLE III

| Percent of catalyst used | Spray ratings after wash | | |
|---|---|---|---|
| | Cotton | Wool | Nylon |
| None | 50 | 80 | 0 |
| 0.3 | 100 | 100 | 100 |

*Example 3*

Six test emulsions were prepared, in each of which part of a 10 percent stock solution of polyvinyl alcohol (Elvanol 50–42), was mixed with 20 parts of water at 80° F. Using high-speed stirring, 30 parts of methylhydrogenpolysiloxane were added slowly and stirred for 2 to 3 minutes until the emulsion was homogeneous. To this initial emulsion 5 parts of a carboxylic acid, as recited in Test Procedures (b) to (f) of Table IV below, were added. No carboxylic acid was added in test procedure (a) as also indicated in Table IV. Each of the emulsions was then made up to 100 parts by addition of water with stirring.

For application to samples of wool flannel, five parts of each of the concentrated emulsions of Test Procedures (a) to (f) of Table IV were diluted with 81 parts of water. To each of these dilute silicone emulsions there was then added one part of the aminosilicone catalyst, gamma-amino-propyltriethoxysilane (100% solids basis).

The individual catalyzed and dilute emulsions were then padded on the samples of wool flannel, and dried for a period of 10 minutes at 250° F. The pick-up of catalyzed and dilute emulsion was 60 percent on the wool padding. The initial water repellency produced and the durability to washing in a standard (Easy) home washer and to dry cleaning with Stoddard Solvent as indicated by spray ratings (AATCC 22–1952) are shown in Table IV.

TABLE IV

| Test procedure | Carboxylic acid in emulsion | Spray ratings | | |
|---|---|---|---|---|
| | | Initial | Washed | Dry cleaned |
| (a) | None | 100 | 100 | 90 |
| (b) | Acetic acid | 100 | 100 | 100 |
| (c) | Levulinic acid | 100 | 100 | 90 |
| (d) | 2-Ethylhexoic acid | 100 | 100 | 100 |
| (e) | Coconut fatty acid | 100 | 100 | 90 |
| (f) | Maleic acid | 90 | 100 | 80 |

*Example 4*

Two emulsions were prepared, in each of which 10 parts of a 10 percent stock solution of polyvinyl alcohol (Elvanol 50–42), were mixed with 40 parts of water at 80° F. Using high-speed stirring, 30 parts of methylhydrogenpolysiloxane were added slowly and stirred for 2 to 3 minutes until the emulsion was homogeneous. To one of these emulsions was added 5 parts of 2-ethylhexoic acid and to each of the emulsions was then added water sufficient to make an emulsion of 100 parts by weight.

For application to cotton print cloth samples, five parts of each of the aforesaid emulsions were diluted with water sufficient to make 100 parts or percent. To each of these dilute emulsions was then added one part of the aminosilicone catalyst, gamma-aminopropyltriethoxysilane (100% solids basis).

The catalyzed and dilute emulsions were then padded on the aforesaid samples of cotton print cloth and an 80 percent wet pick-up effected. The padded sample was then dried for a period of five minutes at 250° F. The spray ratings (AATCC 22–1952) are shown in Table V. The emulsion of Test Procedure (a) as indicated therein contained no carboxylic acid; the emulsion of Test Procedure (b) contained the 2-ethylhexoic acid.

TABLE V

| Test procedure | Carboxylic acid in emulsion | Spray ratings | | |
|---|---|---|---|---|
| | | Initial | Washed | Dry cleaned |
| (a) | None | 100 | 80 | 80 |
| (b) | 2-Ethylhexoic acid | 100 | 90 | 90 |

It will be evident from the results shown in Table V that both emulsions were cured by the aminosilicone, but better durability was given by the emulsion containing the 2-ethylhexoic acid.

Example 5

A concentrated solution containing 30 parts of methylhydrogensiloxane end-blocked with trimethylsiloxy groups, 5 parts of 2-ethylhexoic acid, 1 part of polyvinyl alcohol (Elvanol 50-42), and 64 parts of water, was prepared as described in Example 4 with relation to the emulsion used in Test Procedure (b) thereof.

Five aqueous padding baths were prepared, each containing ten percent by weight of the aforesaid emulsion; and varying percentages by weight, as indicated in Table VI appearing hereinafter, of the catalyst, gamma-aminopropyltriethoxysilane (100% solids basis); together with water in each instance sufficient to total 100 percent.

The emulsions were padded on to a spun nylon fabric at 66 percent wet pick-up and dried for 10 minutes at 220° F. The spray rating (AATCC 22-1952) results are given in Table VI.

TABLE VI

| Percent of gamma-amino-propyltri-ethoxy-silane | Spray ratings | | |
|---|---|---|---|
| | Initial | Washed | Dry cleaned |
| 0.01 | 100 | 100 | 100 |
| 0.05 | 100 | 70+ | 100 |
| 0.10 | 100 | 80+ | 100 |
| 0.50 | 100 | 90 | 100 |
| 1.00 | 100 | 90 | 100 |

Example 6

A concentrated aminosilicone soap made from 144 parts of 2-ethylhexoic acid, 26.2 parts of copolymer comprising 50 percent trimethylsiloxy end-blocked dimethylsiloxane and 50 percent delta-aminobutylmethylsiloxy groups was prepared by charging the aforesaid ingredients into a 500 ml. three-necked flask equipped with stirrer, condenser and thermometer. This composition was refluxed at 83° C. for one hour and then cooled to 25° C. The solvent solution of the resulting soap was a hazy pale yellow liquid.

Samples of cotton print cloth were padded through dilute solutions containing five percent of a concentrated solution formed of 30 percent methylhydrogenpolysiloxane, one percent polyvinyl alcohol, and 69 percent water and amounts of silicone soap as shown in Table VII.

The sampels were padded at 80 percent wet pick-up and cured for 10 minutes at 300° F. The spray rating (AATCC 22-1952) results are shown in Table VII.

TABLE VII

| Percent silicone soap | Spray ratings | | |
|---|---|---|---|
| | Initial | Washed | Dry cleaned |
| 0.10 | 100 | 50 | 70 |
| 0.25 | 100 | 50 | 80 |
| 0.50 | 100 | 80 | 80 |
| 1.00 | 80 | 80 | 70+ |
| 3.00 | 70 | 80 | 70 |
| 5.00 | 50+ | 80- | 70 |

These results indicate the effective cataylsis accomplished with a very small concentration of silicone catalyst and particularly that containing 2-ethylhexoic acid.

Example 7

A treating solution was prepared containing:

1.5 percent of methylhydrogenpolysiloxane
1.5 percent of dimethylpolysiloxane
1.0 percent of the aminosilicone catalyst soap of Example 6
96.0 percent isopropanol.

A sample of 9 oz. of cotton sateen was dipped in a bath of this solution, drained, air dried, and pressed at 300° F. This fabric was highly repellent and had a spray rating of 100 (AATCC 22-1952).

Example 8

Six dilute emulsions were prepared composed of nine percent of a concentrated emulsion containing 30 percent methylhydrogenpolysiloxane, 5 percent of 2-ethylhexoic acid, and one percent polyvinyl alcohol, together with 64 percent water and each containing one percent of one of the aminosilicone catalysts recited in Table VIII. These emulsions were applied individually, each to a separate sample of cotton twill and cured for ten minutes at 320° F. Spray rating tests (AATCC 22-1952) were made after curing was complete and after two one hour aqueous alkaline washes at 160° F. The results are shown in Table VIII.

TABLE VIII

| Catalyst | Spray rating | | |
|---|---|---|---|
| | Initial | After 1 wash | After 2 washes |
| 30% Ethanol solution of gamma-aminopropylpolysiloxane (homopolymer 30% solids) | 100 | 70+ | 70 |
| Copolymer of gamma-aminopropyltriethoxysilane and phenyltriethoxysilane (30% solids) | 100 | 70+ | 70 |
| Copolymeric silicone oil comprised of 75% trimethylsiloxy end-blocked dimethylsiloxane and 25% of delta-aminobutylmethylsiloxy groups | 100 | 70 | 70 |
| Copolymeric silicone oil comprised of gamma-aminopropyltriethyoxsilane and amyltriethoxysilane (30% resins solids) | 100 | 70 | 70- |
| Gamma-aminopropyltriethoxysilane | 100 | 70 | 50 |
| Homopolymer of delta-aminobutylmethylpolysiloxane | 100 | 80- | 80- |

It will be observed that all of the aminosilicone catalysts cured methylhydrogensilicone as evidenced by the spray rating results. Durability to alkaline washing was also induced in the khaki twill to a noticeable degree.

Example 9

A dilute emulsion was prepared containing nine percent of an emulsion formed of 30 percent methylhydrogenpolysiloxane, 5 percent of 2-ethylhexoic acid, and one percent polyvinyl alcohol, together with variable concentrations of gamma-aminopropyltriethoxysilane as indicated in Table IX; the remainder being water sufficient to make 100 percent. This emulsion was applied to cotton, wool, and nylon fabrics. The samples were cured for a period of 10 minutes at 300° F. Washing was repeated at 160° F. with soap and alkali. The results as measured by Spray Rating (AATCC 22-1952) are shown in Table IX.

TABLE IX

| Percent catalyst concentration | Spray ratings | | | | | |
|---|---|---|---|---|---|---|
| | Cotton | | Nylon | | Wool | |
| | Cured | Washed | Cured | Washed | Cured | Washed |
| 0.5 | 100 | 70 | 100 | 90 | 100 | 100 |
| 1.0 | 100 | 70 | 90+ | 90 | 100 | 100 |
| 2.0 | 100 | 80− | 90+ | 90 | 100 | 100 |
| 3.0 | 100 | 70− | 90+ | 90 | 100 | 100 |

The results indicate that gamma-aminopropyltriethoxysilane is effective as a catalyst in extremely small amounts (i.e., 0.5 percent of ethanol product solution or 0.15 percent on a solids basis). On wool and nylon the durability to strong alkaline washing was outstanding.

5 parts aminosilicone catalyst

Example 10

A padding mixture was prepared to examine the compatibility of this system when used with rayon finishing mixes containing methylol urea resins. The padding mixture contained:

30 percent methylol urea (1 part urea:1.3 parts formaldehyde)
6 percent of an emulsion composed of:
    30% methylhydrogenpolysiloxane
    1% polyvinyl alcohol (Elvanol 50–42)
    5% 2-ethylhexoic acid
    64% water
1.5 percent catalyst for methylol urea A clear stock solution of each of the aminosilicone catalysts of Table X was added to the aforesaid padding mix in such a manner that one percent of aminosilicone was incorporated therein. The stock solution was constituted as follows:

10 parts glacial acetic acid
85 parts of water

Each of the resulting compositions evidenced bath stability to emulsion splitting and gel formation for at least seven hours.

The products tested gave the following results as measured by Spray Rate (AATCC 22–1952) on rayon challis, applied by normal procedures and cured for 6 minutes at 325° F.

TABLE X

| Aminosilicone catalyst | Initial spray rate | Spray rate after alkaline wash |
|---|---|---|
| Gamma-aminopropyltriethoxysilane | 100 | 70 |
| Homopolymer of delta-aminobutylmethylpolysiloxane | 100 | 80 |
| Copolymeric silicone oil comprised of gamma-aminopropyltriethoxysilane and vinyltriethoxysilane (25 percent resin solids) | 100 | 80 |
| Copolymeric silicone oil comprising gamma-aminopropyltriethoxysilane and amyltriethoxysilane (30% silicone solids) | 100 | 80 |
| Copolymeric silicone oil composed of 75% trimethylsiloxy end-blocked dimethylsiloxane and 25% of delta-aminobutylmethylsiloxy groups | 90 | 80− |
| 30% ethanol soln. of gamma-aminopropylsiloxane (homopolymer-30% solids) | 80 | 80− |

Example 11

A concentrated emulsion containing 30 parts by weight of methylhydrogensiloxane end-blocked with trimethylsiloxy groups, 5 parts of 2-ethylhexoic acid, 1 part of polyvinyl alcohol (Elvanol 50–42), and 64 parts water, was formed. For application to swatches of cotton khaki twill, 9 parts of the concentrated emulsion were diluted with 81 parts of water. To six such diluted silicone emulsions there was then added 1 part of aminosilicone catalyst predissolved in 9 parts of isopropyl alcohol. Each of the following silicone catalysts was individually tested in this manner:

(a) Gamma-aminopropylpolysiloxane in a 30 percent ethanol solution (homopolymer-30 percent solids);
(b) Copolymer of gamma-aminopropyltriethoxysilane and phenyltriethoxysilane;
(c) Copolymeric silicone oil comprised of gamma-aminopropyltriethoxysiloxy and vinyltriethoxysiloxy units (25 percent resin solids);
(d) Copolymeric silicone oil comprised of gamma-aminopropyltriethoxysiloxy and amyltriethoxysiloxy units (30 percent resins solid);
(e) Gamma-aminopropyltriethoxysilane;
(f) Homopolymer of delta-aminobutylmethylpolysiloxane.

The individual catalyzed and diluted emulsions were padded onto swatches of cotton khaki twill, and dried for a period of ten minutes at 320° F. After this, the treated swatches were tested for water repellency by the standard AATCC spray method. All of the treated swatches showed spray ratings of 100.

What is claimed is:

1. A process for imparting water repellency to substrate materials with an organosiloxane curable to a water-repellent state and containing at least 5 percent by weight of SiH groups, said process comprising (1) contacting said substrate with a composition containing a mixture of said siloxane and, as a curing catalyst for said siloxane, a catalytic amount of a member selected from the group consisting of:

(A) a water soluble aminosilane represented by the formula:

$$\left[ \begin{matrix} R' \\ | \\ N-R- \\ | \\ R'' \end{matrix} \right]_c \begin{matrix} Y_b \\ | \\ SiX_{[4-(c+b)]} \end{matrix}$$

wherein R is a divalent hydrocarbon linkage of at least three carbon atoms chain-length; each of R' and R'' represents a member selected from the group consisting of hydrogen atoms, alkyl, cyanoalkyl, aminoalkyl, carboxyalkyl, carboalkoxyalkyl and aryl radicals, and the monovalent grouping:

$$-R-\underset{\underset{Z}{|}}{\overset{\overset{Y}{|}}{Si}}-X$$

wherein R has the same meaning as defined above; X is an alkoxy radical; Y and Z are members selected from the group consisting of alkyl and aryl radicals; $c$ is a whole number having a value within the range of from 1 to 2 inclusive; $b$ has a value of from 0 to 2; and the sum of $(c+b)$ is not greater than 3; and (B) water-soluble salts thereof comprising said silanes reacted with a member selected from the group consisting of the saturated monocarboxylic acids, the unsaturated monocarboxylic acids, the saturated dicarboxylic acids and the unsaturated dicarboxylic acids and (2) curing said composition on said substrate, said composition being free of any water-insoluble fatty acid salt.

2. A process for imparting water repellency to substrate materials with an organosiloxane curable to a water repellent state and containing at least 5 percent by weight of SiH groups, said process comprising (1) contacting said substrate with a composition containing a mixture of said siloxane and, as a curing catalyst for said siloxane, a catalytic amount of a member selected from the group consisting of:

(A) a water-soluble aminosilicone that is the hydrolyzate of a water-soluble silane represented by the formula:

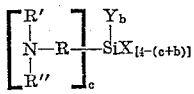

wherein R is a divalent hydrocarbon linkage of at least three carbon atoms chain-length; each of R' and R'' represents a member selected from the group consisting of hydrogen atoms, alkyl, cyanoalkyl, aminoalkyl, carboxyalkyl, carboalkoxyalkyl and aryl radicals, and the monovalent grouping:

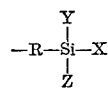

wherein R has the same meaning as defined above; X is an alkoxy radical; Y and Z are members selected from the group consisting of alkyl and aryl radicals; $c$ is a whole number having a value within the range of from 1 to 2 inclusive; $b$ has a value of from 0 to 2; and the sum of $(c+b)$ is not greater than 3; and (B) water-soluble salts thereof comprising said aminosilicone reacted with a member selected from the group consisting of the saturated monocarboxylic acids, the unsaturated monocarboxylic acids, the saturated dicarboxylic acids and the unsaturated dicarboxylic acids and (2) curing said composition on said substrate, said composition being free of any water-insoluble fatty acid salt.

3. A process for imparting water repellency to substrate materials with an organosiloxane curable to a water repellent state and containing at least 5 percent by weight of SiH groups, said process comprising (1) contacting said substrate with a composition containing a mixture of said siloxane and, as a curing catalyst for said siloxane, a catalytic amount of a member selected from the group consisting of:

(A) a water-soluble copolymeric aminosilicone consisting essentially of siloxane units represented by the formula:

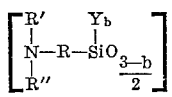

wherein R is a divalent hydrocarbon linkage of at least three carbon atoms chain-length; each of R' and R'' represents a member selected from the group consisting of hydrogen atoms, alkyl, cyanoalkyl, aminoalkyl, carboxyalkyl, carboalkoxyalkyl and aryl radicals, Y is a member selected from the group consisting of alkyl and aryl radicals; and $b$ is an integer having a value from 0 to 2; and at least one other siloxane unit represented by the formula:

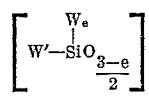

wherein W and W' are monovalent hydrocarbon radicals; and $e$ is an integer having a value of from 0 to 2; and (B) water-soluble salts thereof comprising said aminosilicone reacted with a member selected from the group consisting of the saturated monocarboxylic acids, the unsaturated monocarboxylic acids, the saturated dicarboxylic acids and the unsaturated dicarboxylic acids and (2) curing said composition on said substrate, said composition being free of any water-insoluble fatty acid salt.

4. The process of claim 2 wherein the aminosilicone is a gamma-aminopropylpolysiloxane.

5. The process of claim 2 wherein the substrate is paper.

6. The process of claim 2 wherein the substrate is leather.

7. The process of claim 2 wherein the substrate is a fibrous material selected from the group consisting of cotton, wood, wool, nylon, linen, silk, fur, cellulose triacetate, regenerated cellulose and fibrous glass.

8. The process of claim 2 wherein the substrate is a synthetic polymeric fiber.

9. A composition comprising a mixture of a siloxane curable to a water repellent state and containing at least 5 percent by weight of SiH groups and, as a curing catalyst for said siloxane, a catalytic amount of a water-soluble aminosilane represented by the formula:

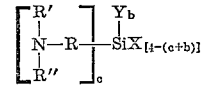

wherein R is a divalent hydrocarbon linkage of at least three carbon atoms chain-length; each of R' and R'' represents a member selected from the group consisting of hydrogen atoms, alkyl, cyanoalkyl, aminoalkyl, carboxyalkyl, carboalkoxyalkyl and aryl radicals, and the monovalent grouping:

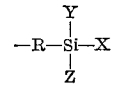

wherein R has the same meaning as defined above; X is a member selected from the group consisting of alkoxy, aminoalkyl and hydroxyalkylaminoalkyl, X is an alkoxy radical; Y and Z are members selected from the group consisting of alkyl and aryl radicals; $c$ is a whole number having a value within the range of from 1 to 2 inclusive; $b$ has a value of from 0 to 2; and the sum of $(c+b)$ is not greater than 3, said composition being free of any water-insoluble, fatty acid salt.

10. A composition comprising a mixture of a siloxane curable to a water repellent state and containing at least 5 percent by weight of SiH groups and, as a curing catalyst for said siloxane, a catalytic amount of a water-soluble aminosilicone that is the hydrolyzate of a silane represented by the formula:

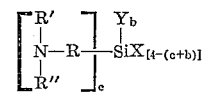

wherein R is a divalent hydrocarbon linkage of at least three carbon atoms chain-length; each of R' and R'' represents a member selected from the group consisting of hydrogen atoms, alkyl, cyanoalkyl, aminoalkyl, carboxyalkyl, carboalkoxyalkyl and aryl radicals, and the monovalent grouping:

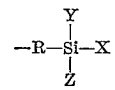

wherein R has the same meaning as defined above; X is an alkoxy radical; Y and Z are members selected from the group consisting of alkyl and aryl radicals; $c$ is a whole number having a value within the range of from 1 to 2 inclusive; $b$ has a value of from 0 to 2; and the sum of $(c+b)$ is not greater than 3, said composition being free of any water-insoluble, fatty acid salt.

11. A composition comprising a mixture of a siloxane curable to a water repellent state and containing at least 5 percent by weight of SiH groups and, as a curing catalyst for said siloxane, a catalytic amount of a water-soluble copolymeric aminosilicone consisting essentially of siloxane units represented by the formula:

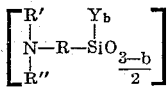

wherein R is a divalent hydrocarbon linkage of at least three carbon atoms chain-length; each of R' and R'' represents a member selected from the group consisting of hydrogen atoms, alkyl, cyanoalkyl, aminoalkyl, carboxyalkyl, carboalkoxyalkyl and aryl radicals, Y is a member selected from the group consisting of alkyl and aryl radicals; and $b$ is an integer having a value from 0 to 2; and at least one other siloxane unit represented by the formula:

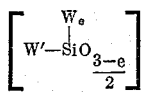

wherein W and W' are monovalent hydrocarbon radicals; and $e$ is an integer having a value of from 0 to 2; said composition being free of any water-insoluble, fatty acid salt.

References Cited by the Examiner
UNITED STATES PATENTS

| | | | |
|---|---|---|---|
| 2,588,366 | 3/1952 | Dennett | 260—29.1 |
| 2,762,823 | 9/1956 | Speir | 260—46.5 |
| 2,842,509 | 7/1958 | Shannon | 260—29.2 |

SAMUEL H. BLECH, *Primary Examiner.*

LEON J. BERCOVITZ, MURRAY TILLMAN, *Examiners.*